United States Patent
Suzuki et al.

(10) Patent No.: US 7,375,446 B2
(45) Date of Patent: May 20, 2008

(54) ACTUATOR INCLUDING ROTOR CASE AND HOUSING WITH SEALING UNIT FOR HERMETIC STRUCTURE

(75) Inventors: Yuzuru Suzuki, Shizuoka (JP); Kazuo Muramatsu, Shizuoka (JP); Hiroaki Fujii, Shizuoka (JP)

(73) Assignee: Minebea Co., Ltd., Kitasaku-Gun, Nagano (JP)

( * ) Notice: Subject to any disclaimer, the term of this patent is extended or adjusted under 35 U.S.C. 154(b) by 226 days.

(21) Appl. No.: 11/135,404

(22) Filed: May 24, 2005

(65) Prior Publication Data

US 2005/0264113 A1 Dec. 1, 2005

(30) Foreign Application Priority Data

May 25, 2004 (JP) .............................. 2004-155359

(51) Int. Cl.
*H02K 7/06* (2006.01)
*H02K 21/14* (2006.01)

(52) U.S. Cl. ...................... 310/86; 310/49 R; 310/83; 310/88; 310/89; 310/90; 251/129.11

(58) Field of Classification Search .......... 251/129.11; 310/49 R, 67 R, 80, 83, 86, 87, 88, 89, 90
See application file for complete search history.

(56) References Cited

U.S. PATENT DOCUMENTS

| 6,224,034 B1 * | 5/2001 | Kato et al. .................. 251/164 |
| 2003/0201413 A1 | 10/2003 | Hirota et al. |

FOREIGN PATENT DOCUMENTS

| EP | 0 987 477 A2 | 3/2000 |
| EP | 1 482 224 A1 | 12/2004 |
| JP | 09-285100 A | 10/1997 |
| JP | 11-030356 A | 2/1999 |
| JP | 2003-322274 A | 11/2003 |

\* cited by examiner

*Primary Examiner*—Karl Tamai
*Assistant Examiner*—David W. Scheuermann
(74) *Attorney, Agent, or Firm*—Foley & Lardner LLP

(57) ABSTRACT

An actuator for use with a fluid channel structure comprises: a stator assembly including stator yokes, and a coil; and a rotor assembly including a housing shaped in a circular hollow-cylinder, an output shaft inserted through the housing, a sleeve, a magnet fixedly attached to the sleeve, and a rotor case. In the actuator described above, the housing includes first and second sealing units having elasticity and disposed at the outer circumference of the circular hollow-cylinder. The first sealing unit makes elastic contact with a wall of a fluid channel of the fluid channel structure, and the rotor case has a cup-like configuration and has an open end portion thereof engaging with the circular hollow-cylinder portion of the housing and pressing on the elastic second sealing unit. Thus, hermetic structure is surely achieved.

16 Claims, 8 Drawing Sheets

ACTUATOR INCLUDING ROTOR CASE AND HOUSING WITH SEALING UNIT FOR HERMETIC STRUCTURE

BACKGROUND OF THE INVENTION

1. Field of the Invention

The present invention relates to an actuator to control flow of fluid flowing in a channel, and more particularly to an actuator provided with a seal structure to prevent leakage of fluid.

2. Description of the Related Art

A shutoff valve is used in a channel of a gas supply equipment, and a flow control valve is used for control of gas flow and for switching control of refrigerant gas channel for air-conditioning. The flow control valve is driven by an actuator such that a rotary motion of a motor shaft is converted into a linear motion of a valve by means of a pinion gear or a screw structure.

FIG. 5 is a cross sectional view of a conventional actuator 40 adapted to drive a flow control valve as described above (refer to, for example, Japanese Patent Application Laid-Open No. H09-285100). The actuator 40 is constituted by a stepping motor and includes: stator yokes 41a and 42a coupled together so as to form a squared C-shape in axial cross section and to shape, in radial plan view, an annular configuration with a center hollow space c1 for housing a rotor assembly; stator yokes 41b and 42b coupled together in the same way as the stator yokes 41a and 42a; coil bobbins 43a and 43b formed by molding, having a squared C-shape cross section so as to form respective coil spaces a1 and b1 therein, and lodged inside respective squared C-shapes formed by the stator yokes 41a and 42a, and by the stator yokes 41b and 42b; coils 45a and 45b made of respective wound magnetic wires 44a and 44b and housed respectively in the coil spaces a1 and b1; a cup-like case 46 to house all the components described above; a lid plate 47 to cover the case 46; rubber packing members 48 and 49 sandwiched respectively between the stator yoke 42b and a bottom 46a of the case 46, and between the stator yoke 41a and the lid plate 47 with a bearing 58; and a rotary shaft 50 having a screw portion 50a formed toward its distal end.

FIG. 6 is a cross sectional view of a relevant portion of a gas meter incorporating the actuator of FIG. 5. The actuator 40 is fixedly attached to a frame 52 of the gas meter by screws 54 such that the screw portion 50a of the rotary shaft 50 is screwed into a center screw hole of a shutoff valve 51, and that a ring-like rubber packing member 53 is sandwiched between the lid plate 47 and the frame 52. A gas flow control is conducted such that the shutoff valve 51 is linearly moved upward (in the figure) by the rotation of the rotary shaft 50 and with guidance of a guide rod 59 and is brought in touch with a valve seat 56 so as to clog up an open mouth 57 of a gas channel 55 thereby shutting off gas flowing through the gas channel 55. Also, gas, which flows into the inside of the actuator 40 through a hole of the bearing 58, specifically through a gap between the bearing 58 and the rotary shaft 50, is shut off by the cup-like case 46, the lid plate 47, the coils 45a and 45b, and the rubber packing members 48 and 49 thus preventing the gas from leaking out.

FIG. 7 is a cross sectional view of another conventional actuator 60 and a gas meter incorporating the actuator 60 (refer to, for example, Japanese Patent Application Laid-Open No. H11-030356). The actuator 60 includes: a rotor 61 composed of a rotary shaft 62, a sleeve 63 having the rotary shaft 62 inserted through its center, and a magnet 64 disposed at the outer circumference of the sleeve 63 and provided with magnetic poles; a stator 65 having coils 66 and disposed outside the rotor 61 so as to have its inner circumferential surface oppose the magnetic poles of the magnet 64; a transmission unit 62a constituted by a screw which is formed at the outer circumferential surface of the rotary shaft 62 and which is adapted to screw together with a screw hole of a moving block 67; and a rotation stopper 68 adapted to prohibit the moving block 67 from rotating together with the rotary shaft 62. A flow control block 69 is connected to the moving block 67 so as to be movable in the axial direction, and is brought in touch with a valve seat 71 of a fluid channel 70 to thereby control the flow amount of fluid. A bulkhead 72 including a flange 72a is provided. The bulkhead 72 is made of a non-magnetic material, shaped into a circular hollow-cylinder with one end blinded, and hermetically partitions off the stator 65 from the rotor 61 and the flow control block 69 connected to the rotor 61 via the moving block 67. A mounting plate 73 is provided, to which the flange 72a of the bulkhead 72 and the stator 65 are attached. An O-ring 74 as a sealing unit is disposed between the flange 72a and the mounting plate 73, and an O-ring 75 as a sealing unit is disposed between a flange 70a of the fluid channel 70 and the mounting plate 73.

FIG. 8 is a cross sectional view of still another conventional actuator 80 and a gas meter incorporating the actuator 80 (refer to, for example, Japanese Patent Application Laid-Open No. 2003-322274). The actuator 80 is used as a solenoid valve and functions to press a valve plug against a valve seat for controlling the flow amount of fluid. The actuator 80 constituting a solenoid is disposed in a gas meter body 100, and activates a pilot valve 87 thereby controlling the flow amount of fluid. The solenoid (the actuator 80) includes: a sleeve 81 having its upper end portion engagingly fitted into a hole formed in the body 100; a plunger 82 disposed in the sleeve 81 so as to be movable in the axial direction; a core 83 shaped hollow-cylindrical and engagingly fitted in the lower end of the sleeve 81; a shaft 86 having its one end portion supported by a bearing 84 formed in the body 100 and the other end portion supported by a bearing 85 disposed in the hollow of the core 83; a spring 88 disposed between the plunger 82 and the bearing 85 and functioning to press the aforementioned pilot valve 87 by way of the shaft 86 for clog-up operation; a magnet coil 89 disposed outside the sleeve 81; a yoke 90 disposed so as to surround the magnet coil 89; and a plate 91 disposed around the sleeve 81 so as to form a magnetic circuit between the yoke 90 and the sleeve 81. The core 83 has its one open end clogged by an insert member 92, and then the tip ends of the core 83 and the insert member 92 are sealed up by a welded joint 92a. An O-ring 93 is disposed in an open space defined by the body 100, the sleeve 81, and the plate 91. The actuator 80 is fixed to the body 100 such that an end portion 90a of the yoke 90 is bent inward so as to catch a flange 100a of the body 100.

In the first example described with reference to FIGS. 5 and 6, the actuator 40 constituted by a stepping motor must be attached to the gas meter such that the actuator 40 is set to the gas meter, the ring-like rubber packing member 53 is put between the lid plate 47 and the frame 52, and the actuator 40 is fixed to the frame 52 of the gas meter by the screws 54 thus taking time for screwing work, which results in deterioration of workability. Also, if there is variance in tightening torque to drive the screws 54, gas flowing in the gas channel 55 can leak out through a gap possibly formed between the lid plate 47 and the frame 52. Further, since the position of the actuator 40 is shifted with respect to the axial direction according to the strength to tighten the screws 54, the axial play of the rotary shaft 50 cannot be duly controlled. And, gas which gets through a gap between the rotary shaft 50 and the bearing 58 and flows inside is supposed to be prevented from exiting out by means of members functioning as sealing unit, such as the case 46, the lid plate 47, the coils 45a and 45b, the rubber packing members 48 and 49, and the bearing 58, and it is difficult to coordinate so many members properly.

In the second example described with reference to FIG. 7, since a sealing structure is formed such that the O-ring 75 is disposed between the mounting plate 73 of the actuator 60 and the wall of the fluid channel 70, the mounting plate 73 must be screwed to the flange 70a of the fluid channel 70 thus taking time for screwing work, which results in deterioration of workability. And, if there is variance in tightening torque to drive the screws, it can happen that gas flowing in the gas channel leaks out through a gap possibly formed between the flange 70a of the fluid channel wall 70 and the mounting plate 73.

In the third example described with reference to FIG. 8, gas flowing into the inside of the actuator 80 through a gap between the bearing 84 and the shaft 86 is prevented from leaking out by the core 83 and the insert member 92 welded to the core 83, thus taking time for welding work to form the welded joint 92a, which results in deterioration of workability. And, the actuator 80 is fixed to the body 100 of the gas meter such that the end portion 90a of the yoke 90 is bent inward so as to catch the flange 100a formed at the bottom portion of the body 100, thus requiring dedicated tools for bending work, which hinders simple attachment and detachment of the actuator 80.

SUMMARY OF THE INVENTION

The present invention has been made in light of the above problems, and it is an object of the present invention to provide an actuator which is simply structured with reduced number of components, is hermetically sealed to prevent gas flowing into the inside of the actuator from leaking out, and which can be readily attached to and also detached from a fluid channel structure, such as a gas meter.

In order to achieve the object described above, according to an aspect of the present invention, there is provided an actuator for use with a fluid channel structure, which comprises: (a) a stator assembly including *stator yokes, *a coil disposed between the stator yokes, and *a front plate; and (b) a rotor assembly disposed inside the stator assembly and including *a housing including a ring plate portion, a circular hollow-cylinder portion continuous with the ring plate portion, and **a flange portion disposed at an outer circumference of the circular hollow-cylinder portion, *an output shaft inserted through an opening of the ring plate portion of the housing, *a sleeve disposed around the output shaft, *a magnet fixedly attached to an outer circumference of the sleeve, and *a rotor case having a cup-like configuration, and in the actuator described above, the housing further includes first and second sealing units which have elasticity, and which are disposed at the outer circumference of the circular hollow-cylinder portion so as to be located apart from each other, wherein the first sealing unit makes hermetic contact with a wall of a fluid channel of the fluid channel structure, and wherein the second sealing unit makes hermetic contact with an open end portion thereof to fit tightly the rotor case with the circular hollow-cylinder portion of the housing.

In the aspect of the present invention, the rotor assembly may be structured such that the sleeve having the magnet is disposed in the rotor case and is connected to the output shaft in such a manner that a rotary motion of the sleeve is converted into a linear motion of the output shaft.

In the aspect of the present invention, the sleeve and the output shaft may be respectively provided with screw mechanisms for mutual connection, and a rotation stopper to prohibit the output shaft from rotating may be disposed between the output shaft and the housing, whereby the rotary motion of the sleeve is converted into the linear motion of the output shaft.

In the aspect of the present invention, a flange portion may be formed at the open end portion of the rotor case and may be pressed against the flange portion of the housing so as to achieve hermetic contact between the rotor case and the housing.

In the aspect of the present invention, the first and second sealing unit may be constituted by O-rings.

In the aspect of the present invention, the stator assembly and the rotor assembly may be fixedly attached to each other such that bent-up portions formed at the front plate included of the stator assembly are hooked at the housing of the rotor assembly.

In the aspect of the present invention, the rotor assembly may further include bearings at both ends of the sleeve, the bearings being constituted by open ball bearings without sealing members.

The above-described actuator according to the present invention has the following advantages.

Since the first sealing unit seals up a gap between the actuator and the fluid channel structure, and since the second sealing unit seal up a gap between the stator assembly and the rotor assembly, a hermetic structure is achieved with a small number of components and fluid is prevented from leaking out. Specifically, fluid that is prevented by means of the first sealing unit from leaking out between the actuator and the fluid channel structure and that flows through a gap around the output shaft into the rotor assembly can be securely prevented by means of the second sealing unit from leaking out of the rotor assembly, that is to say, from flowing into the stator assembly. Also, since the rotor case, the rotating portion of the rotor assembly, and the stator assembly are duly positioned with respect to the housing, an air gap distance between the magnet of the rotor assembly and the rotor case can be minimized with a high precision, which means that a minimum gap distance is achieved between the magnet and the stator assembly with a high precision. And, since no elastic members are involved in defining the axial direction of the structure, the accuracy of the distance between the bearings is stabilized thus enabling highly accurate control of its axial play.

Further, since the first sealing unit that interfaces between the actuator and the fluid channel structure so as to seal up a gap therebetween has elasticity, the actuator can be rigidly attached to the fluid channel structure by means of the elasticity without using screws.

Still further, since the rotary motion of the sleeve is converted into the linear motion of the output shaft without any extra conversion mechanism, the structure can be simplified and downsized.

Still further, since the first sealing unit has elasticity, the actuator can be easily and firmly attached to the fluid channel structure without using screws.

Still further, the stator assembly and the rotor assembly, which are finished severally, can be readily combined into the actuator as a final product by catching the bent-up portions of the front plate at the housing.

And, usage of the open bearings having no sealing members contributes to reducing the production cost.

DETAILED DESCRIPTION OF THE PREFERRED EMBODIMENT

An embodiment of the present invention will be described with reference to FIGS. 1 to 3.

Figure 2:
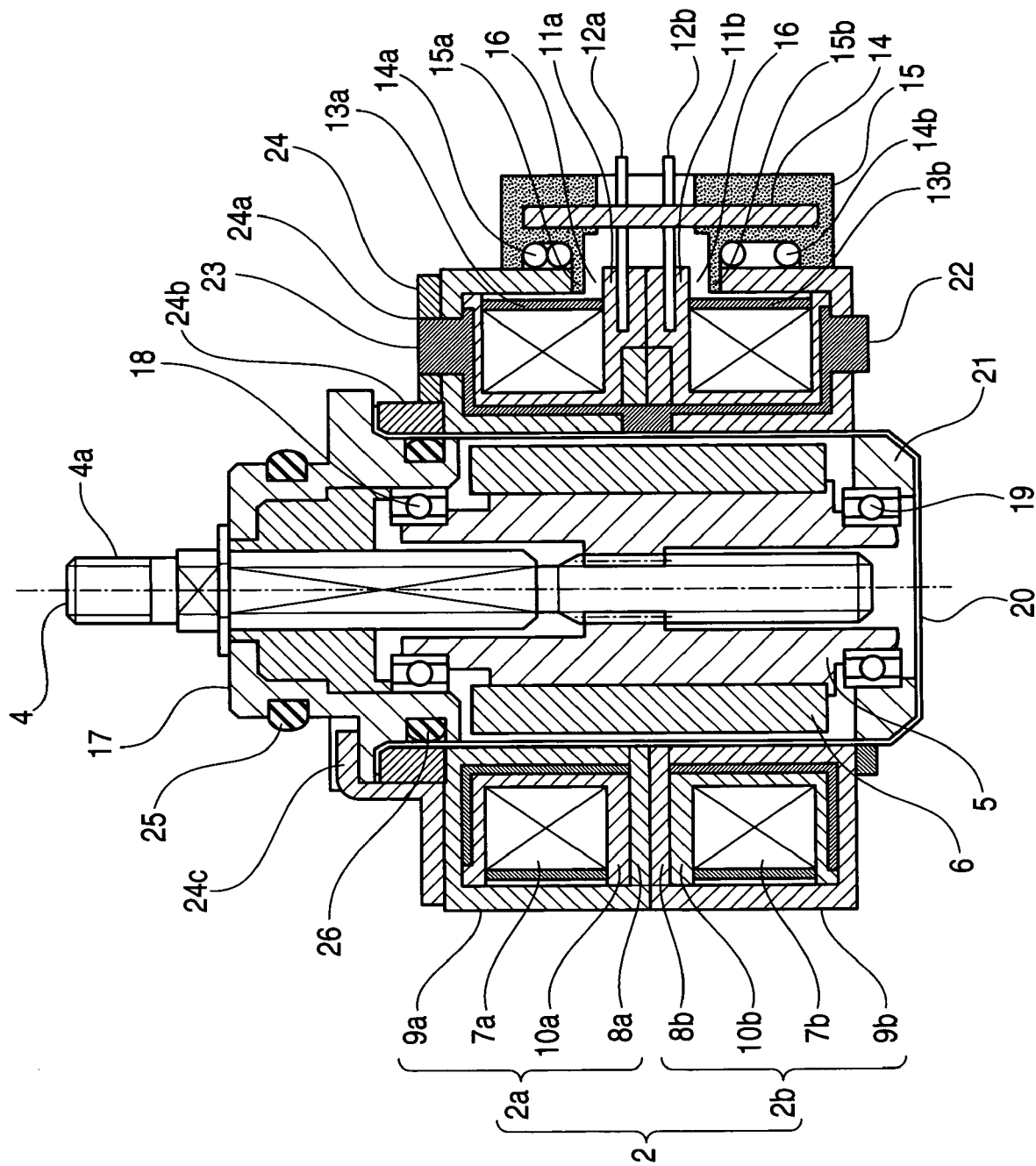
FIG. 2 is a cross sectional view of the actuator of FIG. 1, take along line II-II.
Figure 3:
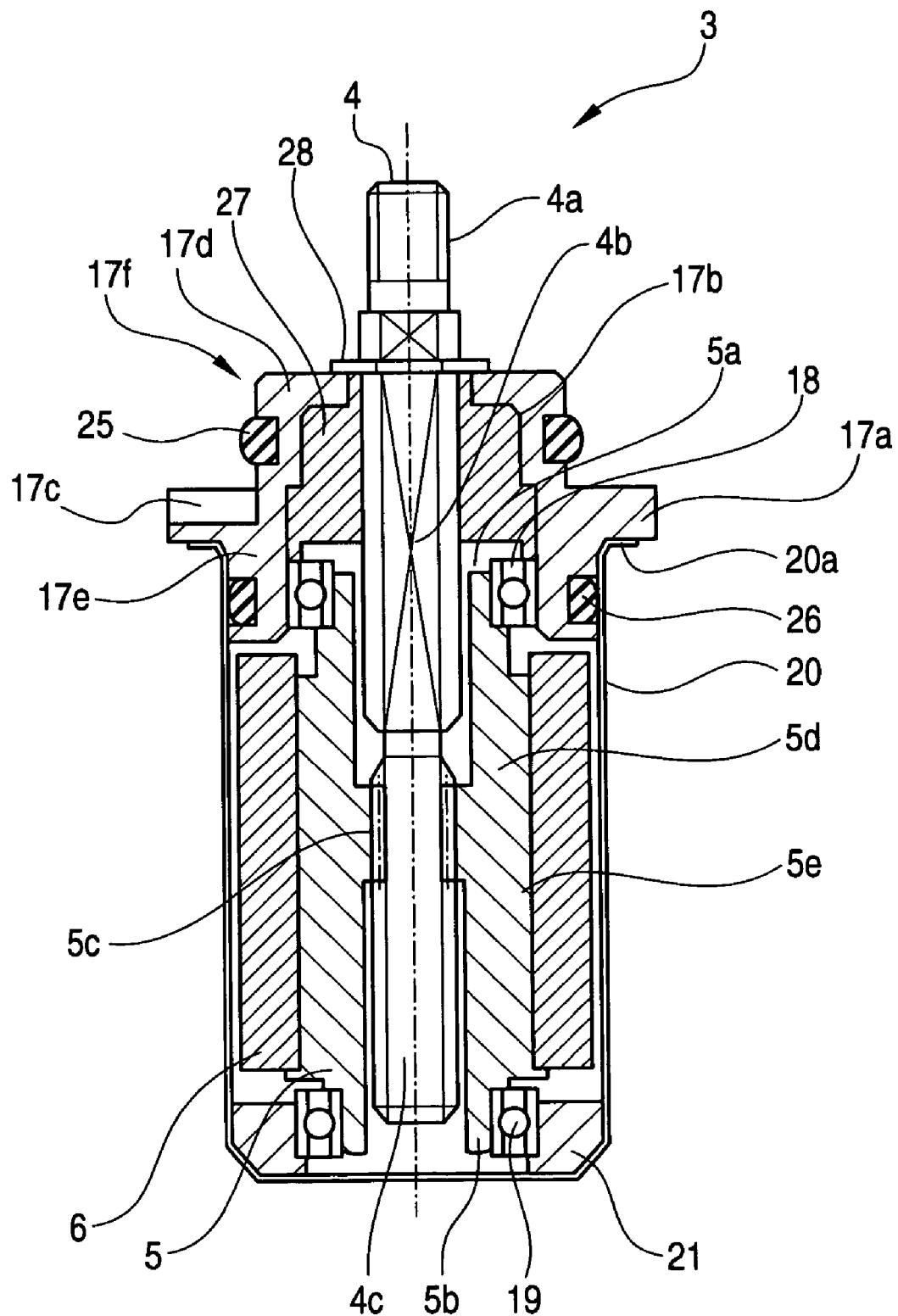
FIG. 3 is a cross sectional view of a rotor assembly of the actuator of FIG. 2.

Referring first to FIG. 2, an actuator 1 is generally composed of a stator assembly 2 and a rotor assembly 3 (refer to FIG. 3). The stator assembly 2 includes a first stator unit 2a and a second stator unit 2b, and is disposed so as to surround the rotor assembly 3. The first stator unit 2a includes a coil 7a, a bobbin 10a having the coil 7a wound therearound, and stator yokes 8a and 9a. Each of the stator yokes 8a and 9a has a plurality of pole teeth formed so as to constitute a part of the inner circumference of the stator assembly 2. The bobbin 10a shaped in a squared C-shape in cross section has a terminal block 11a integrally formed therewith and having a terminal pin 12a implanted therein. A cover 13a is attached around the coil 7a thereby preventing dusts from coming in. The second stator unit 2b includes a coil 7b, a bobbin 10b, stator yokes 8b and 9b, a terminal block 11b, terminal pin 12b and a cover 13b, and is structured in the same way as the first stator unit 2a.

A printed board 14 is fixedly disposed at a portion of the outer circumference of the stator assembly 2 by means of a pin holder 15 which works as a cover for the terminal pins 12a and 12b, and which have its portions 15a and 15b engaged with a cutout portion 16 formed at the first and second stator units 2a and 2b. Wire cables 14a and 14b are disposed in respective open spaces formed between the pin holder 15 and the stator yokes 8a and 8b.

Referring to FIG. 3, the rotor assembly 3 includes an output shaft 4, a sleeve 5 formed of synthetic resin, a magnet 6 magnetized with multi-poles and fixedly attached to the outer circumference of the sleeve 5, a housing 17 (refer back to FIG. 2), bearings 18 and 19 to support the sleeve 5, and a rotor case 20 shaped in a cup-like configuration.

The housing 17 includes a ring plate portion 17d adapted to make contact with an E-ring 28 (to be described later) as a stopper at the time of initial setting, a circular cylinder portion 17e continuous with the ring plate portion 17d, and a flange portion 17a protruding outward from the circular cylinder portion 17e at a right angle. A rotation stopper 27 to block the-rotation of the output shaft 4 is disposed at an open space 17b inside the circular cylinder portion 17e. The rotation stopper 27, while blocking the rotary movement of the output shaft 4, functions also as a bearing to allow the output shaft 4 to axially move. The flange portion 17a has recesses 17c (refer also to FIG. 1) with which bent-up portions 24c of a front plate 24 (to be described later) are engaged. The meeting portion of the ring plate portion 17d and the circular cylinder portion 17e forms an edge portion 17f, which, together with an O-ring 25 as a sealing unit fixedly disposed at the circular cylinder portion 17e, is engagingly and fixedly fitted to an open mouth portion of a fluid channel structure (to be described later). The O-ring 25 is formed of an elastic material, such as rubber.

A bearing 18 is disposed at the open space 17b so as to be attached to the inner surface of the circular cylinder portion 17e, and a bearing 19 is attached to the inner circumferential surface of a ring-like support member 21 which is disposed at the bottom portion of the rotor case 20.

The sleeve 5 is shaped to have an H-shape axial cross section, and includes a cylinder portion 5d, a screw portion 5c protruding inward from the inner surface of the cylinder portion 5d so as to form an annular configuration, projection portions 5a and 5b extending axially from respective both ends of the cylinder portion 5d, and a magnet attaching portion 5e formed at the outer surface of the cylinder portion 5d.

The output shaft 4 is divided into three portions: a screw portion 4a formed at the outer surface of one end portion thereof protruding to be exposed; a transmission mechanism portion 4c formed toward the other end portion thereof and provided with a screw engaging with the screw portion 5c of the sleeve 5; and a flat surface portion 4b formed between the screw portion 4a and the transmission mechanism portion 4c and going through the rotation stopper 27 to be circumferentially immovable and axially movable. The output shaft 4 thus structured has respective diameters differing from one portion to another according to its design. The screw portion 4a has a valve plug engagingly attached thereto, and activates it so as to press against a valve seat formed in the fluid channel thereby controlling the flow amount of fluid, for example, gas.

A fabrication of the stator assembly 2 shown in FIG. 2 will be described.

The first stator unit 2a is fabricated such that the bobbin 10a having the coil 7a wound therearound is put between the stator yokes 8a and 9a which are made of a soft-magnetic material, for example, an electrogalvanized steel plate (SECC), an electromagnetic soft steel plate (SUY), and a silicon steel plate. Each of the stator yokes 8a and 9a has a plurality of pole teeth arranged in a comb-like configuration, and respective pole teeth of the stator yokes 8a and 9a are shifted from each other with a phase-difference of 180 degrees in terms of electrical angle.

The second stator unit 2b includes the bobbin 10b, the coil 7a, and the stator yokes 8b and 9b, and is fabricated in the same way as the first stator unit 2a.

Then, the stator units 2a and 2b are put in a mold (not shown) and set to be shifted from each other with a phase-difference of 90 degrees in terms of electrical angle, and synthetic resin, such as polybutylene terephthalate (PBT) resin, is injected into the mold (not shown). The synthetic resin injected fills up the gaps at the pole teeth of the first and second stator units 2a and 2b, and at the same time integrally forms lower bosses 22 and upper bosses 23. As a result of the resin injection molding, the stator units 2a and 2b are joined together.

Figure 1:
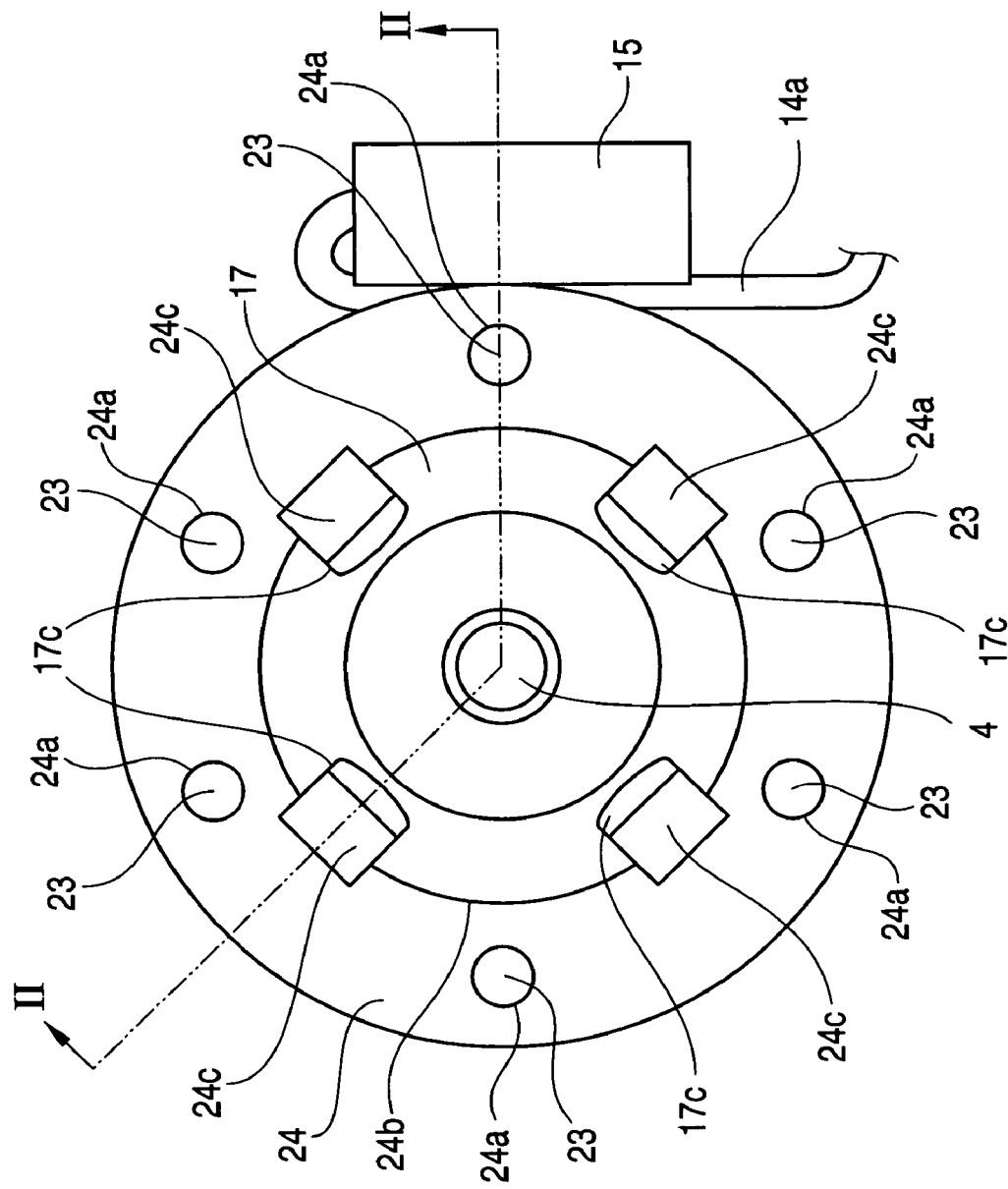
FIG. 1 is a top plan view of an actuator according to an embodiment of the present invention.

The aforementioned front plate 24 shown in FIG. 1, which has a circular opening 24b, and which has a plurality (four in the figure) of claw-like bent-up portions 24c formed at the inner circumference thereof defined by the circular opening 24b, is attached onto the first stator unit 2a such that holes 24a formed at the front plate 24 are engaged with the upper bosses 23 formed as integral parts of the first and second stator units 2a and 2b joined together. Then, the pin holder 15 formed of synthetic resin and having the printed board 14 attached thereto is attached to the outer circumference of the joined first and second stator units 2a and 2b such that the portions 15a and 15b of the pin holder 15 are engaged with the cutout portion 16 formed at an area of the joined first and second stator units 2a and 2b. Thus, the stator assembly 2 is completed.

As described above, the rotor assembly 3 includes the output shaft 4, the sleeve 5, the magnet 6, the housing 17, the rotation stopper 27, the bearings 18 and 19, and the rotor case 20, wherein the housing 17 is thrust into the rotor case 20 so that the flange portion 17a of the housing is pressed against a flange portion 20a formed at an open mouth end of the rotor case 20 while the rotor case 20 makes elastic contact with an O-ring 26 as a sealing unit which is formed of an elastic material, and which is fixedly disposed at the outer surface of the cylinder portion 17e of the housing 17, whereby an airtight structure is formed. Thus, the rotor assembly 3 is completed. The flange portion 20a of the rotor case 20 is to be hermetically sandwiched between the flange portion 17a of the housing 17 and the stator assembly 2. The rotor case 20 has the ring-like support member 21 disposed at the bottom thereof, and the bearing 19 is fitted in the support member 21.

The rotor assembly 3 is fabricated as follows.

The magnet 6 is fixed onto the magnet attaching portion 5e of the sleeve 5 which is formed of, for example, PBT resin, and which has the screw portions 5c formed with a female screw. Both end portions, namely the screw portion 4a and the transmission mechanism portion 4c of the output shaft 4 are each provided with a male screw, and the flat surface portion 4b therebetween is provided with two flat surfaces formed by shaving process so as to be parallel to each other. The transmission mechanism portion 4c has a smaller diameter than the flat surface portion 4b, and the screw portion 4a has a diameter smaller than the distance between the two flat surfaces of the flat surface portion 4b.

The housing 17 is made of a metallic material, such as aluminum alloy and stainless steel for applications requiring heat resistance, but may alternatively be formed of a resin material such as engineering plastic for use in non-high-temperature environments. Two grooves are formed at the outer surface of the circular hollow-cylinder portion 27e so as to circumferentially extend along the flange portion 17a, respectively, to both sides thereof, and the O-rings 25 and 26 are put in respective grooves to sit therein.

The projection portions 5a and 5b of the sleeve 5 are fitted into the inner rings of the bearings 18 and 19, respectively, so that the sleeve 5 is rotatably supported by the bearings 18 and 19. The transmission mechanism portion 4c of the output shaft 4 is inserted through the sleeve 5 such that the male screw of the transmission portion 4c engages with the female screw of the screw portion 5c of the sleeve 5. Then, the output shaft 4 is inserted through the housing 17, and the aforementioned E-ring 28 as a stopper is attached.

The end portion (lower side in FIG. 3) of the above described structure having the magnet 6 is put into the rotor case 20 made of a non-magnetic steel material, for example, non-magnetic stainless steel so that the flange portion 20a of the rotor case 20 tightly makes contact with one end of the flange portion 17a of the housing 17, and the rotor assembly 3 is completed. In this process, the O-ring 26 functions to seal up a gap between the housing 17 and the rotor case 20 and to fix together both components. In this connection, the rotor case 20, which is disposed between the magnet 6 and the stator yokes 8a, 9a, 8b and 9b, should have its thickness minimized to the extent that the minimum mechanical strength required is ensured. Also, the rotor case 20 can be fabricated inexpensively by the method of drawing.

The rotor case 20 of the rotor assembly 3 completed as described above is press-fitted into the stator assembly 2, and the bent-up portions 24c of the front plate 24 are hooked at the recesses 17b of the flange portion 17a of the housing 17 so that the rotor assembly 3 is fixed to the stator assembly 2, thus completing the actuator 1. The actuator 1 may alternatively be completed such that the rotor case 20 alone is first press-fitted into the stator assembly 2, and then the remaining parts of the rotor assembly 3 is put into the rotor case 20.

An operation of the actuator 1 will hereinafter be described.

When current is applied to the coils 7a and 7b, the stator yokes 8a, 9a, 8b and 9b are magnetized thereby causing the rotor magnet 6 and also the sleeve 5 to rotate. Since the screw portion 5c of the sleeve 5 engages threadedly with the transmission mechanism portion 4c of the output shaft 4, and since the output shaft 4 is prohibited from rotating by the rotation stopper 27, the rotary movement of the rotor magnet 6 and the sleeve 5 is converted into the linear movement of the output shaft 4 in the axial direction.

Positional accuracy with respect to the axial direction is critical in such an actuator, and therefore the axial play of a rotor assembly must be controlled strictly. In the present invention, since no elastic members are involved in defining the axial direction of the structure, uncertainties are removed thus enabling highly accurate control of its axial play.

An application example of the present invention will be described with reference to FIG. 4, and also FIG. 2 as appropriate.

Figure 4:
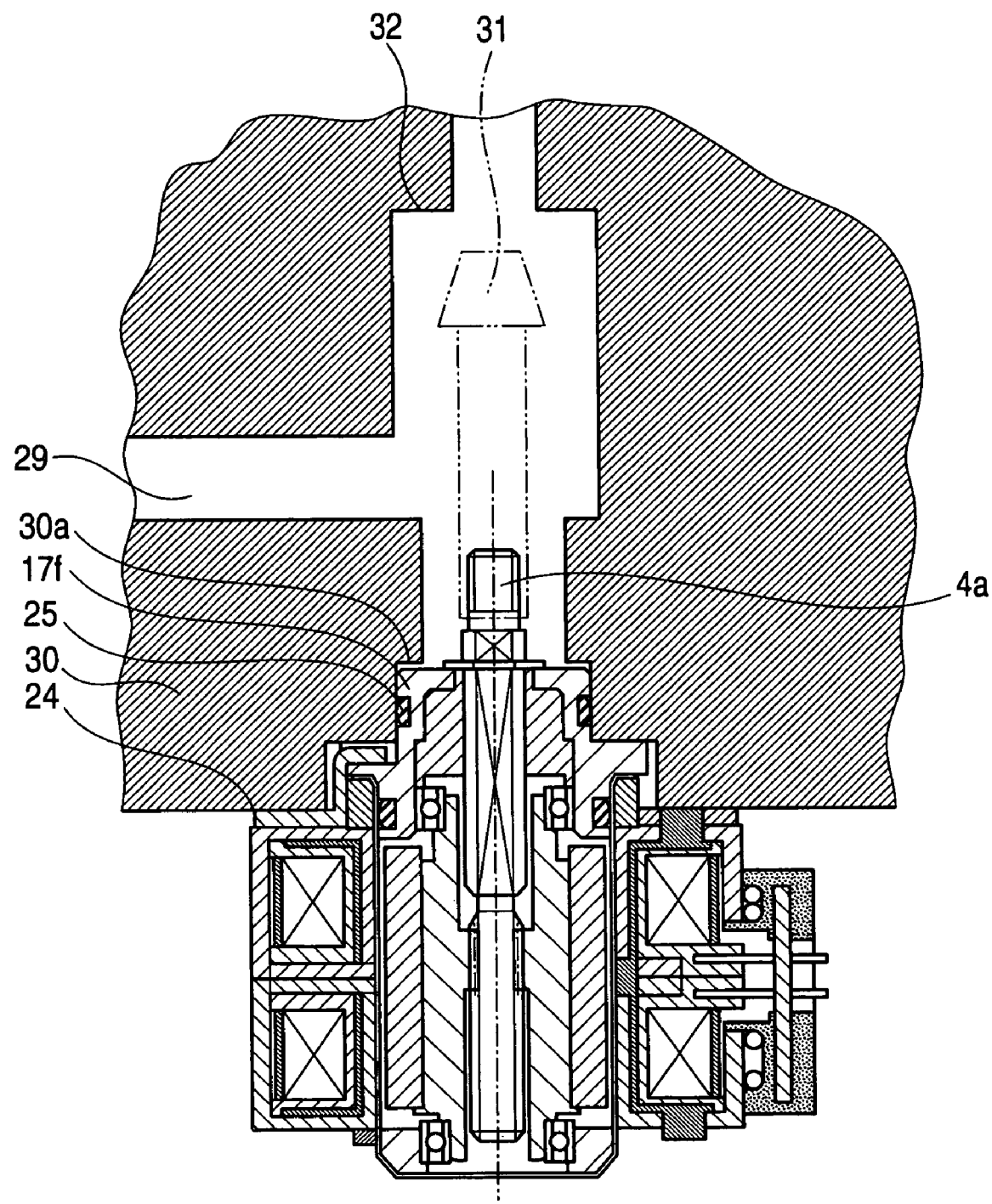
FIG. 4 is a cross sectional view of an application, where the actuator of FIG. 2 is attached to a fluid channel structure.
Figure 5:
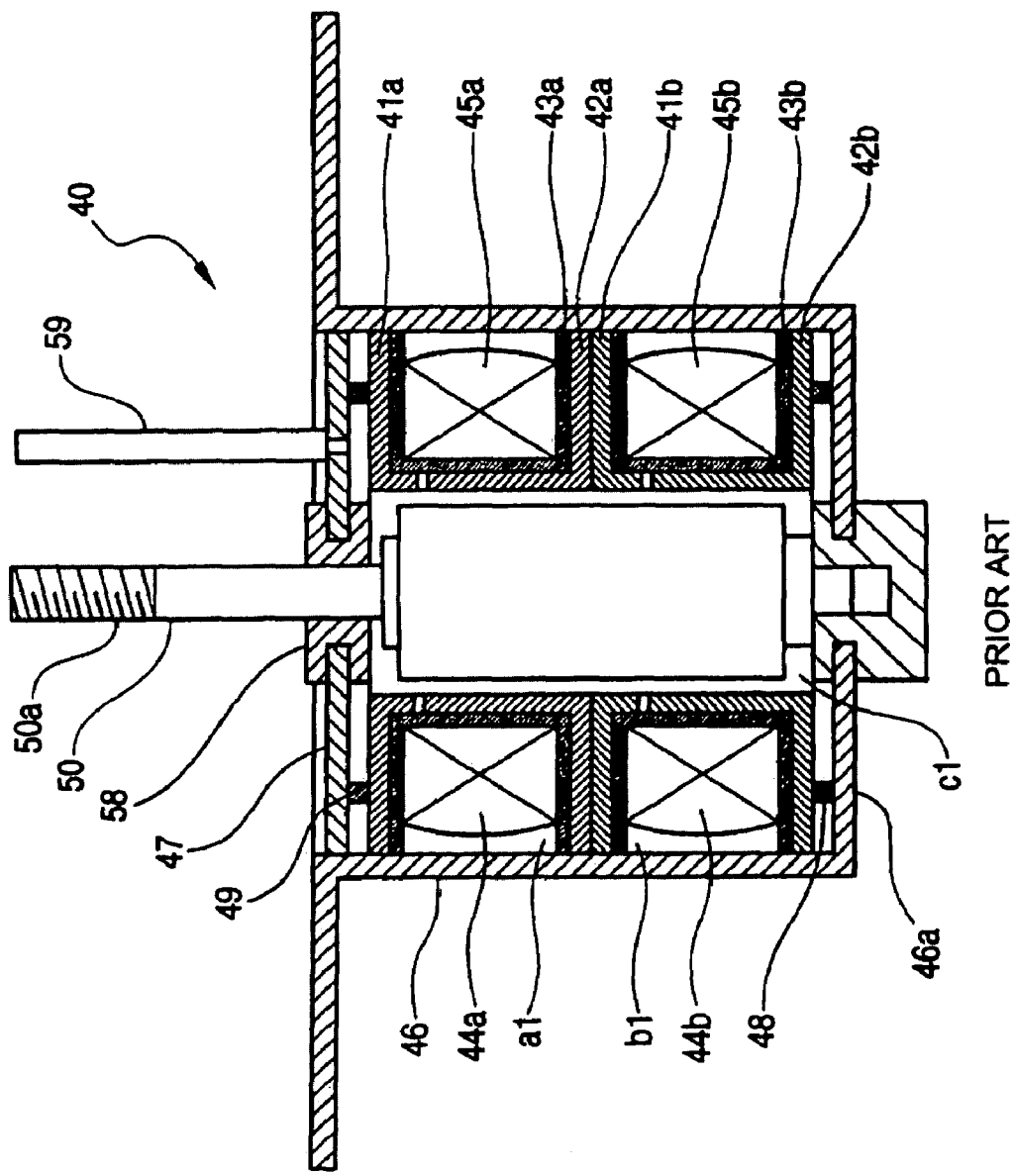
FIG. 5 is a cross sectional view of a conventional actuator (first example)
Figure 6:
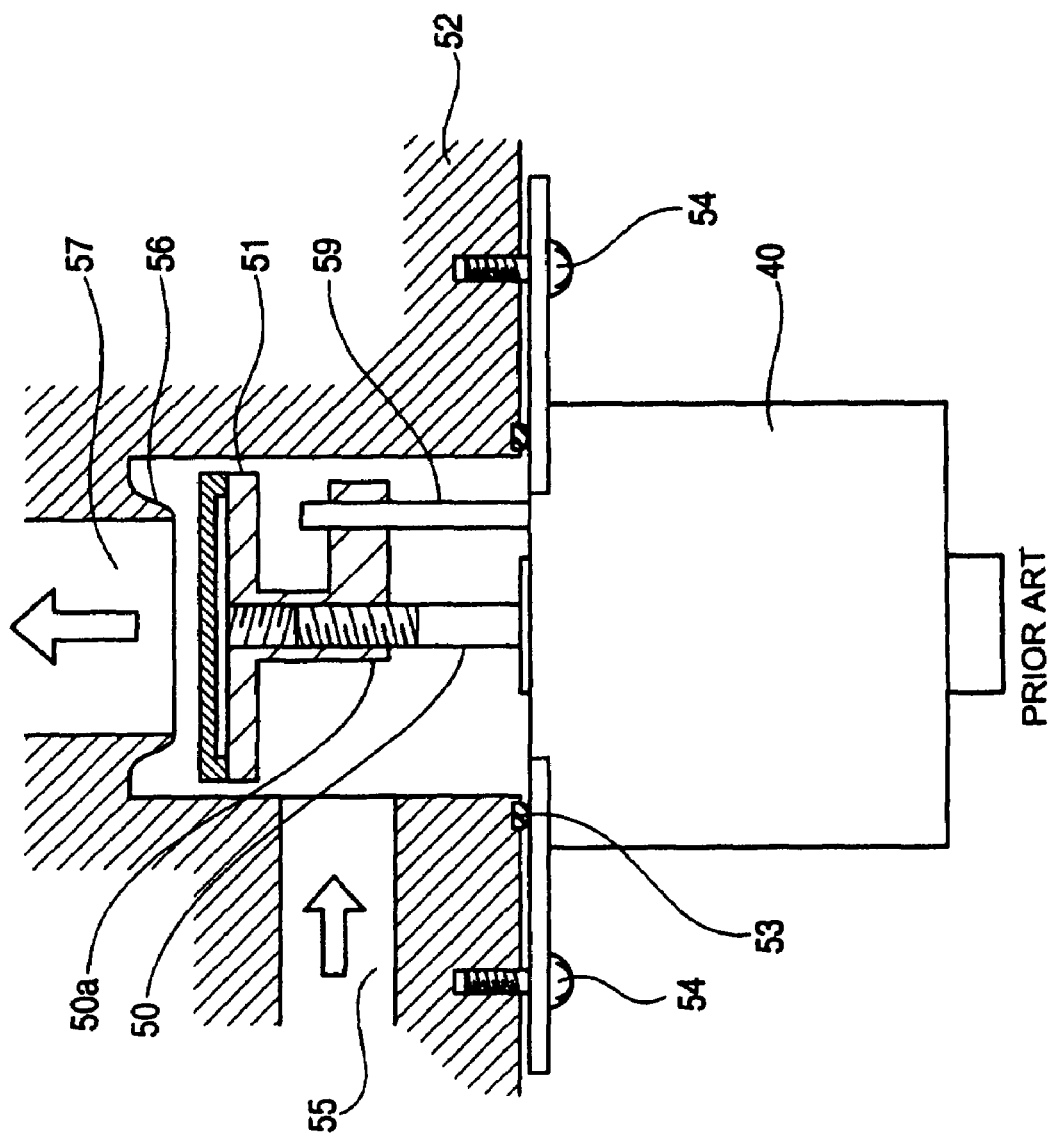
FIG. 6 is a cross sectional view of a fluid channel structure incorporating the conventional actuator of FIG. 5.
Figure 7:
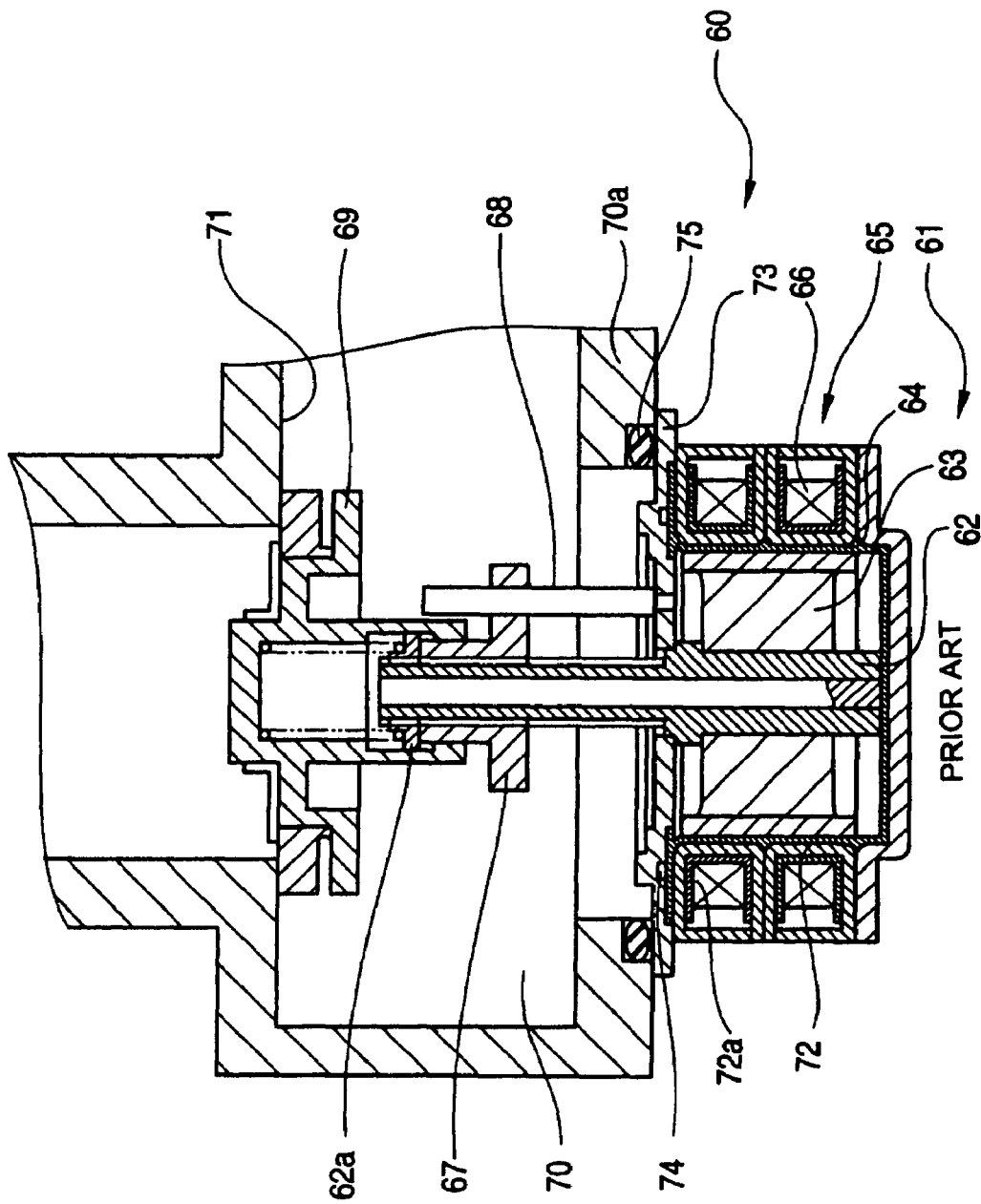
FIG. 7 is a cross sectional view of a fluid channel structure incorporating another conventional actuator (second example)
Figure 8:
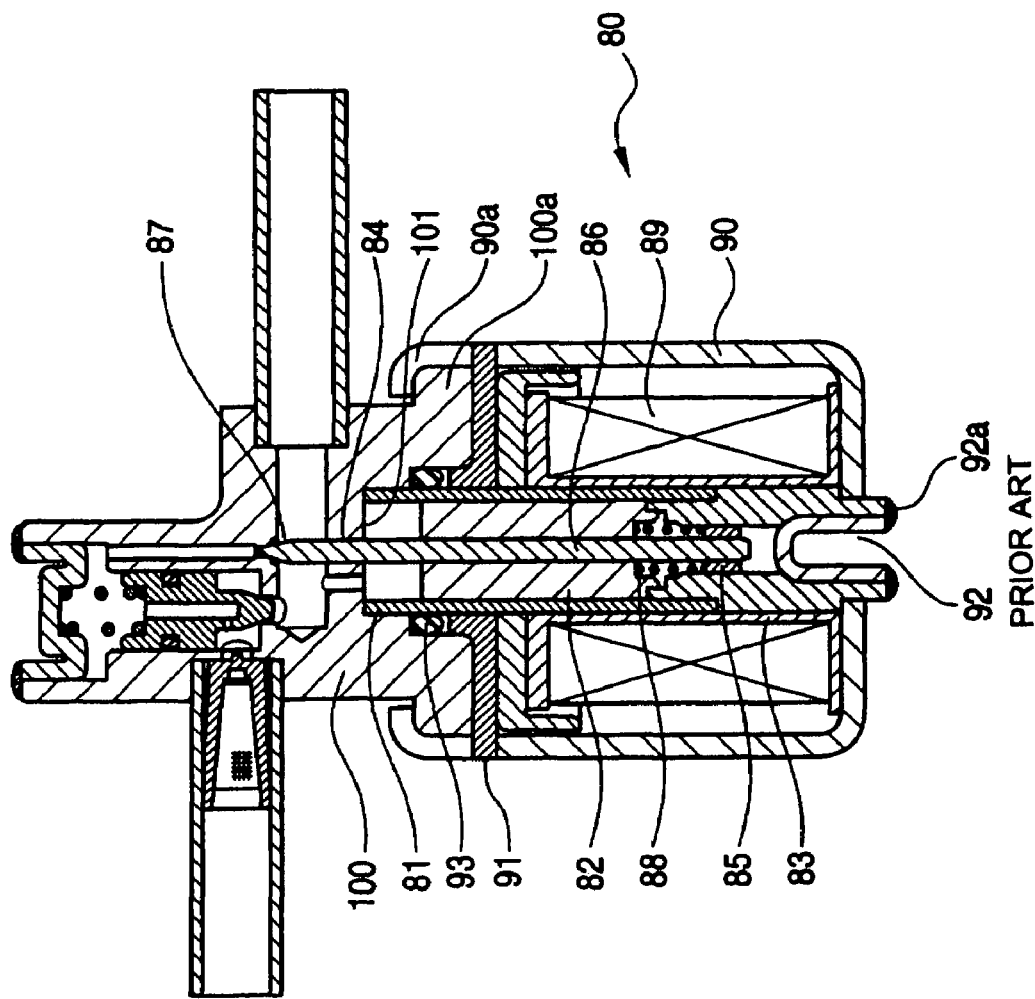
FIG. 8 is a cross sectional view of a fluid channel structure incorporating still another conventional actuator (third example).

Referring to FIG. 4, the actuator 1 described above can be easily attached to a fluid channel structure 30 including a fluid channel 29, such as a gas meter, such that the edge portion 17f of the housing 17 is engaged in an opening 30a of the fluid channel structure 30, wherein the housing 17 and the fluid channel structure 30 are fixed together by means of the O-ring 25 disposed around the outer circumference of the housing 17 so as to seal up an gap existing therebetween. If required, the front plate 24 may have its configuration modified so as to enable provision of screw holes, so that the actuator 1 can be screwed to the fluid channel structure 30 for more rigid attachment.

The output shaft 4 and the valve plug 31 are connected to each other such that the screw portion 4a of the output shaft 4 engages with a screw formed on the valve plug 31. Thus, when the output shaft 4 makes its linear motion toward a valve seat 32, the valve plug 31 connected to the output shaft 4 is adapted to make contact with the valve seat 32 thereby controlling the amount of gas flowing in the fluid channel 29. The gas, which flows in the fluid channel 29 and leaks through a gap around the output shaft 4 into the inside of the rotor assembly 3, is prevented from leaking outside therefrom by the rotor case 20 together with the O-ring 26.

Since the actuator 1 is provided with the rotor case 20 adapted to hermetically partition off the stator assembly 2 and the rotor assembly 3, the bearings 18 and 19 can be open ball bearings without sealing members thus reducing the production cost. In the application example described above, the bearings 18 and 19 are constituted by ball bearings, but may alternatively be constituted by oil-impregnated metal bearings, or resin bearings.

Obviously, many modifications and variations of the present invention are possible in light of the above teachings. Thus, it is to be understood that, within the scope of the appended claims, the invention may be practiced otherwise than as specifically described above.

This application claims priority from Japanese Patent Application 2004-155359, filed May 25, 2004, which is incorporated herein by reference in its entirety.

What is claimed is:

1. An actuator for use with a fluid channel structure, the actuator comprising:
   a) a stator assembly including
      stator yokes,
      a coil disposed between the stator yokes, and
      a front plate attached to the stator yokes; and
   b) a rotor assembly disposed inside the stator assembly, and including
      a housing including a ring plate portion, a circular hollow-cylinder portion continuous with the ring plate portion, and a flange portion disposed at an outer circumference of the circular hollow-cylinder portion, the housing further including first and second elastic sealing units disposed at the outer circumference of the circular hollow-cylinder portion so as to be located apart from each other, wherein the first elastic sealing unit makes hermetic contact with a wall of a fluid channel of the fluid channel structure,
      an output shaft inserted through an opening of the ring plate portion of the housing,
      a sleeve disposed around the output shaft,
      a magnet fixedly attached to an outer circumference of the sleeve, and
      a rotor case having a cup-like configuration, wherein the second elastic sealing unit located inside the rotor case makes hermetic contact with an open end portion of the rotor case so as to fit tightly the rotor case with the circular hollow-cylinder portion of the housing.

2. An actuator according to claim 1, wherein the sleeve having the magnet is disposed in the rotor case and is connected to the output shaft in such a manner that a rotary motion of the sleeve is converted into a linear motion of the output shaft.

3. An actuator according to claim 1, wherein the sleeve and the output shaft are respectively provided with screw mechanisms for mutual connection, and a rotation stopper to prohibit the output shaft from rotating is disposed between the output shaft and the housing, whereby a rotary motion of the sleeve is converted into a linear motion of the output shaft.

4. An actuator according to claim 1, wherein a flange portion is formed at the open end portion of the rotor case and is pressed against the flange portion of the housing so as to achieve hermetic contact between the rotor case and the housing.

5. An actuator according to claim 1, wherein the first and second elastic sealing units are constituted by 0-rings.

6. An actuator according to claim 1, wherein the stator assembly and the rotor assembly are fixedly attached to each other such that bent-up portions formed at the front plate included of the stator assembly are hooked at the housing of the rotor assembly.

7. An actuator according to claim 1, wherein the rotor assembly further includes bearings at both ends of the sleeve, the bearings being constituted by open ball bearings without sealing members.

8. An actuator comprising:
   a) a stator assembly including
      stator yokes,
      a coil disposed between the stator yokes, and
      a front plate attached to the stator yokes; and
   b) a rotor assembly disposed inside the stator assembly, and including
      a housing including a ring plate portion, a circular hollow-cylinder portion continuous with the ring plate portion, and a flange portion disposed at an outer circumference of the circular hollow-cylinder portion, the housing further including first and second elastic sealing units disposed at the outer circumference of the circular hollow-cylinder portion so as to be located apart from each other,
      an output shaft inserted through an opening of the ring plate portion of the housing,
      a sleeve disposed around the output shaft,
      a magnet fixedly attached to an outer circumference of the sleeve, and
      a rotor case having a cup-like configuration,
      wherein the second elastic sealing unit located inside the rotor case makes hermetic with an open end portion of the rotor case so as to fit tightly the rotor case with the circular hollow-cylinder portion of the housing.

9. An actuator according to claim 8, wherein the sleeve having the magnet is disposed in the rotor case and is connected to the output shaft in such a manner that a rotary motion of the sleeve is converted into a linear motion of the output shaft.

10. An actuator according to claim 8, wherein the sleeve and the output shaft are respectively provided with screw mechanisms for mutual connection, and a rotation stopper to prohibit the output shaft from rotating is disposed between the output shaft and the housing, whereby a rotary motion of the sleeve is converted into a linear motion of the output shaft.

11. An actuator according to claim 8, wherein a flange portion is formed at the open end portion of the rotor case and is pressed against the flange portion of the housing so as to achieve hermetic contact between the rotor case and the housing.

12. An actuator according to claim 8, wherein the first and second elastic sealing units are constituted by 0-rings.

13. An actuator according to claim 8, wherein the stator assembly and the rotor assembly are fixedly attached to each other such that bent-up portions formed at the front plate included of the stator assembly are hooked at the housing of the rotor assembly.

14. An actuator according to claim 8, wherein the rotor assembly further includes bearings at both ends of the sleeve, the bearings being constituted by open ball bearings without sealing members.

15. An actuator according to claim 6, wherein the bent-up portions engage with recesses formed at the flange portion of the housing to fix the rotor assembly to the stator assembly.

16. An actuator according to claim 13, wherein the bent-up portions engage with recesses formed at the flange portion of the housing to fix the rotor assembly to the stator assembly.

* * * * *